US007884878B2

(12) United States Patent
Karasawa

(10) Patent No.: US 7,884,878 B2
(45) Date of Patent: Feb. 8, 2011

(54) LENS APPARATUS, IMAGING APPARATUS, AND AUTOMATIC FOCUSING CONTROL METHOD

(75) Inventor: Katsumi Karasawa, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 665 days.

(21) Appl. No.: 11/399,911

(22) Filed: Apr. 7, 2006

(65) Prior Publication Data
US 2006/0244582 A1 Nov. 2, 2006

(30) Foreign Application Priority Data
Apr. 28, 2005 (JP) ............................. 2005-131330

(51) Int. Cl.
G03B 13/00 (2006.01)
H04N 5/232 (2006.01)

(52) U.S. Cl. .................. 348/354; 348/348; 348/349; 348/353; 348/345; 348/356

(58) Field of Classification Search ......... 348/354–356, 348/345, 349
See application file for complete search history.

(56) References Cited

U.S. PATENT DOCUMENTS

| 5,126,849 A | | 6/1992 | Senuma | |
|---|---|---|---|---|
| 6,049,354 A | * | 4/2000 | Sekine et al. | 348/208.6 |
| 6,278,489 B1 | | 8/2001 | Hirasawa | |
| 6,654,061 B2 | * | 11/2003 | Yamada | 348/355 |
| 6,683,652 B1 | * | 1/2004 | Ohkawara et al. | 348/347 |
| 7,133,078 B2 | * | 11/2006 | Nagasawa | 348/353 |
| 7,403,230 B2 | * | 7/2008 | Yasuda | 348/353 |
| 7,499,095 B2 | * | 3/2009 | Kwon et al. | 348/345 |
| 2004/0036795 A1 | | 2/2004 | Fujii | |
| 2004/0046890 A1 | | 3/2004 | Kikuchi et al. | |
| 2005/0083429 A1 | * | 4/2005 | Yasuda | 348/345 |
| 2005/0249488 A1 | * | 11/2005 | Takei | 396/101 |

FOREIGN PATENT DOCUMENTS

| EP | 0279423 A2 * | 2/1988 |
|---|---|---|
| EP | 794660 | 9/1997 |
| JP | 05-161055 A | 6/1993 |
| JP | 9-065184 A | 3/1997 |
| JP | 11-234549 A | 8/1999 |
| JP | 2004-126562 A | 4/2004 |

* cited by examiner

Primary Examiner—Jason Chan
Assistant Examiner—Michael Osinski
(74) Attorney, Agent, or Firm—Canon U.S.A., Inc. I.P. Division

(57) ABSTRACT

A lens apparatus capable of carrying out a suitable AF control operation even when text or character information is superimposed on a video signal is provided. The lens apparatus is configured to generate first and second AF evaluation values from a video signal obtained from an imaging unit of a camera apparatus, and to perform focusing control based on the second AF evaluation value. In the lens apparatus, the first AF evaluation value is selectively output to a second AF evaluation value generating unit for every scanning line of the video signal.

9 Claims, 7 Drawing Sheets

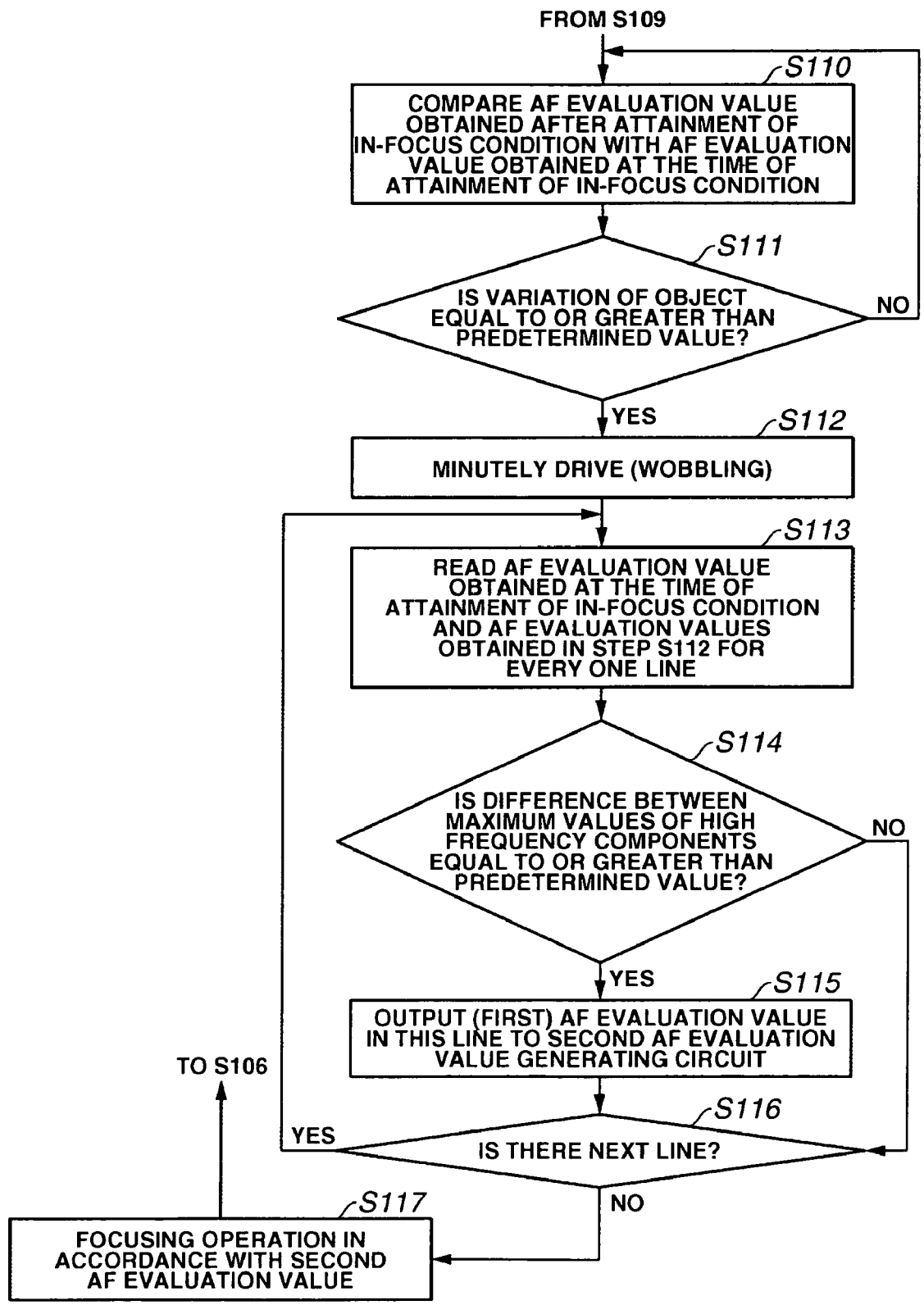

LENS APPARATUS, IMAGING APPARATUS, AND AUTOMATIC FOCUSING CONTROL METHOD

BACKGROUND OF THE INVENTION

1. Field of the Invention

The present invention relates to an imaging apparatus including a lens apparatus and a camera apparatus, such as a video camera or the like. More particularly, the present invention relates to a focusing operation and focusing control and especially, an imaging apparatus for broadcasting.

2. Description of the Related Art

A conventional imaging apparatus such as a video camera or the like is equipped with an automatic focus detection/ focusing control (hereinafter referred to as "AF control") function. As an AF control system, a contrast-type automatic focus detection system has been mainly used. In this contrast-type automatic focus detection system, a signal corresponding to sharpness (contrast) of an object is extracted from an imaged video signal to be used to carry out a focus detection operation of an imaging optical system.

FIG. 6 is a block diagram showing one example of a configuration of an imaging apparatus. An AF control operation using the contrast-type automatic focus detection system will be described with reference to FIG. 6.

A lens apparatus 401 is removably attached to a camera body 413. The lens apparatus 401 includes a first fixed lens unit 402, a second lens unit (zoom lens) 403, a diaphragm 404, a third fixed lens unit 405, and a fourth lens unit (focus lens) 406. The second lens unit 403 is movable for carrying out zooming. The fourth lens unit 406 is equipped with both a focus adjusting function and a compensation function for compensating for the movement of a focal plane caused by zooming.

Light from an object is focused on an imaging plane of an image sensor 414 in the camera body 413 via each lens unit and the diaphragm 404 of the lens apparatus 401. The formed object image is converted into an electrical signal by the image sensor 414. The electrical signal from the image sensor 414 is supplied as an image signal to an image processing unit 415.

In the image processing unit 415, the input image signal is sampled and held. The sampled and held image signal is amplified to have a predetermined level by AGC (automatic gain control), and is then converted into a digital signal by A/D (analog-to-digital) conversion. Further, the digital signal is converted into a standard television signal. The standard television signal is output to a video output terminal 416.

Then, the video signal is input to a video signal input terminal 407 of the lens apparatus 401 via a cable 417, and is then supplied to an AF evaluation value generating unit 408. In the AF evaluation value generating unit 408, a high-frequency component, which varies according to a focusing condition, is extracted from the video signal by filtering or the like, and a sharpness evaluation value (an AF evaluation value) is generated using the high-frequency component. The AF evaluation value is output to an AF drive control unit 409.

The AF drive control unit 409 determines a driving direction of the focus lens 406 as to whether an in-focus point is located on a far distance side or a close distance side with respect to the current position of the focus lens 406. In order to determine the driving direction, the AF drive control unit 409 drives a motor 412 so as to minutely drive (wobble) the focus lens 406. Then, the AF drive control unit 409 determines an in-focus direction based on a variation of the AF evaluation value output from the AF evaluation generating unit 408 in each position of the focus lens 406.

Thus, the AF drive control unit 409 moves the focus lens 406 at a predetermined speed such that the AF evaluation value output from the AF evaluation generating unit 408 reaches a peak value. After the AF evaluation value passes over the peak value, the AF drive control unit 409 reverses a driving direction of the focus lens 406. Then, the AF drive control unit 409 minutely drives the focus lens 406 such that the AF evaluation value becomes maximum (see Japanese Patent Application Laid-Open No. 9-065184). Furthermore, the AF drive control unit 409 controls motors 410 and 411 to drive the zoom lens 403 and the diaphragm 404.

However, the above-described conventional AF control system has the following disadvantages in the case where a video signal input from the video signal input terminal 407 has text or character information superimposed thereon.

1) When the superimposed information exists in a focus detection area, the superimposed information becomes a high-frequency component. Therefore, an in-focus direction cannot be determined based on the AF evaluation value obtained from the AF evaluation value generating unit 408 even if the focus lens 406 is driven between the far distance side and the close distance side (in a hill-climbing fashion) to determine the in-focus direction.

2) As for the AF evaluation value obtained from the AF evaluation value generating unit 408, even if the focus lens 406 is driven in a whole area (in a whole scanning fashion), the superimposed information becomes a high-frequency component as described above. Therefore, a suitable AF evaluation value corresponding to positions for an object and the focus lens 406 cannot be obtained. Thus, a suitable in-focus position cannot be obtained. As a result of this, an AF control operation may stop in a defocused state of an object, or the AF control operation may not be completed. Thus, the superimposed information may hinder the AF control operation.

3) If the superimposed information is information superimposed in a blinking manner at intervals of a predetermined number of fields or frames of a video signal, blinking of the superimposed information may be recognized as a variation of an object even when the object is in an in-focus condition. In that case, an unnecessary AF control operation may be activated.

SUMMARY OF THE INVENTION

The present invention is directed to a lens apparatus capable of carrying out a suitable AF control operation even when text or character information is superimposed on a video signal.

In one aspect of the present invention, a lens apparatus mountable on a camera apparatus includes an imaging optical system, a first generating unit, a second generating unit, and a control unit. The first generating unit is configured to generate a first sharpness evaluation value from a video signal output from the camera apparatus corresponding to an output signal from an imaging unit configured to photoelectrically convert an object image formed by the imaging optical system. The second generating unit is configured to generate a second sharpness evaluation value using the first sharpness evaluation value. The control unit is configured to control a focus adjusting operation of the imaging optical system based on the second sharpness evaluation value. The control unit performs output control of the first sharpness evaluation value to the second generating unit for every scanning line of the video signal.

In another aspect of the present invention, an automatic focusing control method for a lens apparatus mountable on a camera apparatus includes the steps of receiving a video signal from the camera apparatus corresponding to an output signal from an imaging unit configured to photoelectrically convert an object image formed by an imaging optical system, generating a first sharpness evaluation value based on the video signal, detecting superimposed information included in the video signal, which is superimposed on the output signal, based on the first sharpness evaluation value, generating a second sharpness evaluation value based on the first sharpness evaluation value and the superimposed information, and performing a focus adjusting operation of the imaging optical system based on the second sharpness evaluation value.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4B is a flowchart illustrating an AF control operation of the imaging apparatus according the first exemplary embodiment.

DETAILED DESCRIPTION OF THE EMBODIMENTS

Exemplary embodiments of the invention will be described in detail below with reference to the drawings. In the following embodiments, an imaging apparatus is discussed which includes a broadcasting lens apparatus mountable on a broadcasting camera apparatus.

First Exemplary Embodiment

Figure 1:
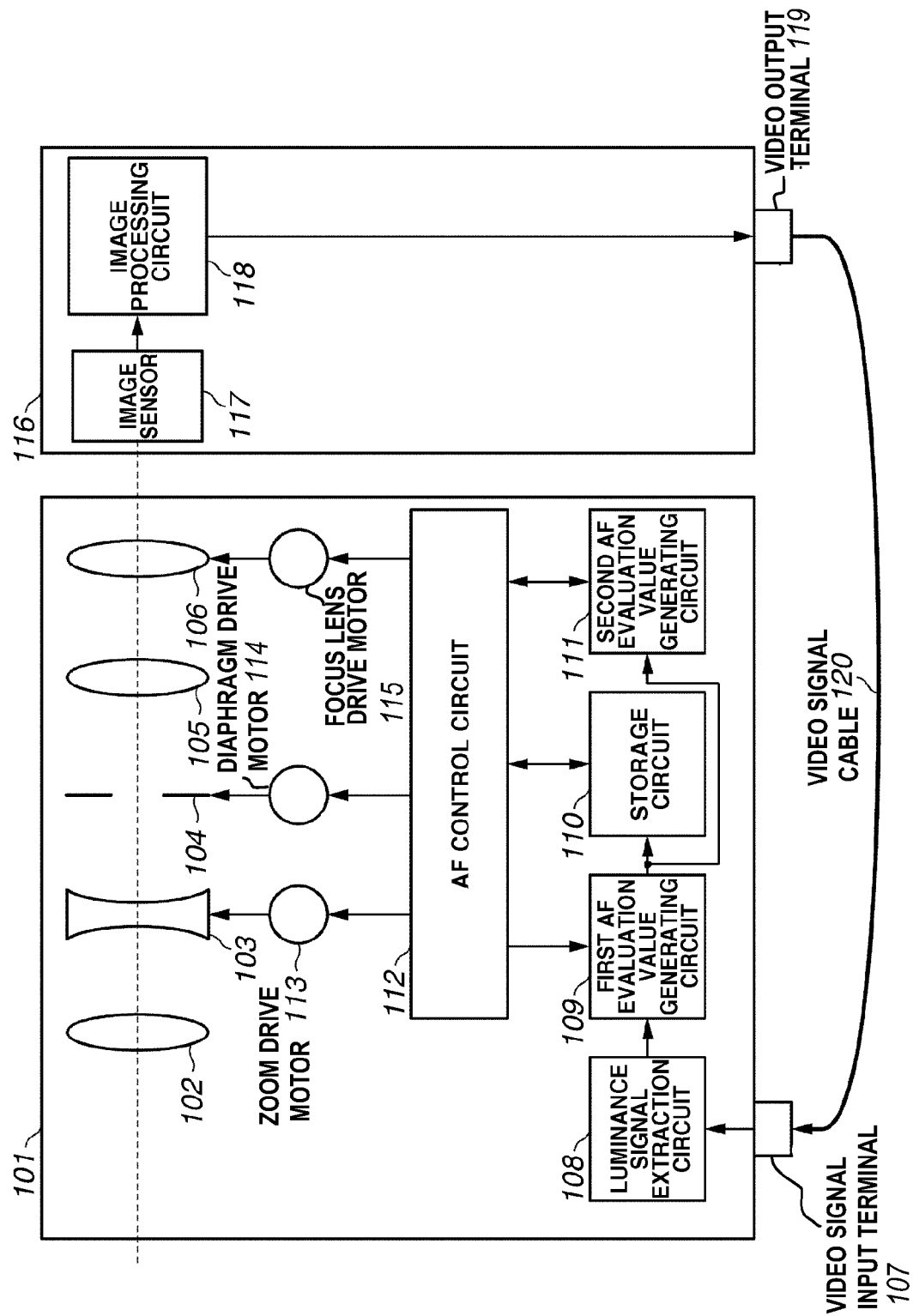
FIG. 1 is a block diagram of a configuration of an imaging apparatus according to a first exemplary embodiment of the present invention.

FIG. 1 is a block diagram of a configuration of an interchangeable lens type video camera (i.e., an imaging apparatus) according to a first exemplary embodiment of the present invention.

A lens apparatus 101 is removably attached to a camera body 116. The lens apparatus 101 includes a first fixed lens unit 102, a second lens unit (zoom lens) 103, a diaphragm 104, a third fixed lens unit 105, and a fourth lens unit (focus lens) 106. The second lens unit 103 is movable for carrying out zooming. The fourth lens unit 106 is equipped with both a focus adjusting function and a compensation function for compensating for the movement of a focal plane caused by zooming.

Light from an object passes through the first fixed lens unit 102, the second lens unit 103, the diaphragm 104, the fixed third lens unit 105, and the fourth lens unit 106. The light from the object having passed through the lens apparatus 101 is focused on an imaging plane of an image sensor 117 in the camera body 116. The formed object image is converted into an electrical signal by the image sensor 117. The electrical signal from the image sensor 117 is supplied as an image signal to an image processing circuit 118. In the image processing circuit 118, the input image signal is sampled and held. The sampled and held image signal is amplified to have a predetermined level by AGC (automatic gain control), and is then converted into a digital signal by A/D (analog-to-digital) conversion. Further, the digital signal is converted into a standard television signal. The standard television signal is output to a video output terminal 119.

Further, the standard television signal output from the video output terminal 119 is input to a video signal input terminal 107 of the lens apparatus 101 via a video signal cable 120, and is then supplied to a luminance signal extraction circuit 108. In the luminance signal extraction circuit 108, only a luminance signal is extracted from the input standard television signal. The extracted luminance signal is supplied to a first AF evaluation value generating circuit 109.

The first AF evaluation value generating circuit 109 generates an AF evaluation value (a first AF evaluation value) based on the luminance signal. The first AF evaluation value generated by the first AF evaluation value generating circuit 109 is stored in a storage circuit (a memory) 110 and is also supplied to a second AF evaluation value generating circuit 111 under the control of an AF control circuit 112. The storage circuit 110, in accordance with a writing control signal from the AF control circuit 112, stores AF evaluation values generated by the first AF evaluation generating circuit 109 for a plurality of fields for every vertical synchronizing signal of the video signal.

The AF control circuit 112 reads out AF evaluation values for a plurality of fields, which are stored in the storage circuit 110, and an AF evaluation value (a second AF evaluation value) generated by the second AF evaluation value generating circuit 111. Further, the AF control circuit 112 controls a focus lens drive motor 115 to drive the focus lens 106. Furthermore, in accordance with a zoom drive control signal and a diaphragm drive control signal, the AF control circuit 112 controls a zoom drive motor 113 and a diaphragm drive motor 114 to drive the zoom lens 103 and the diaphragm 104.

Figure 2:
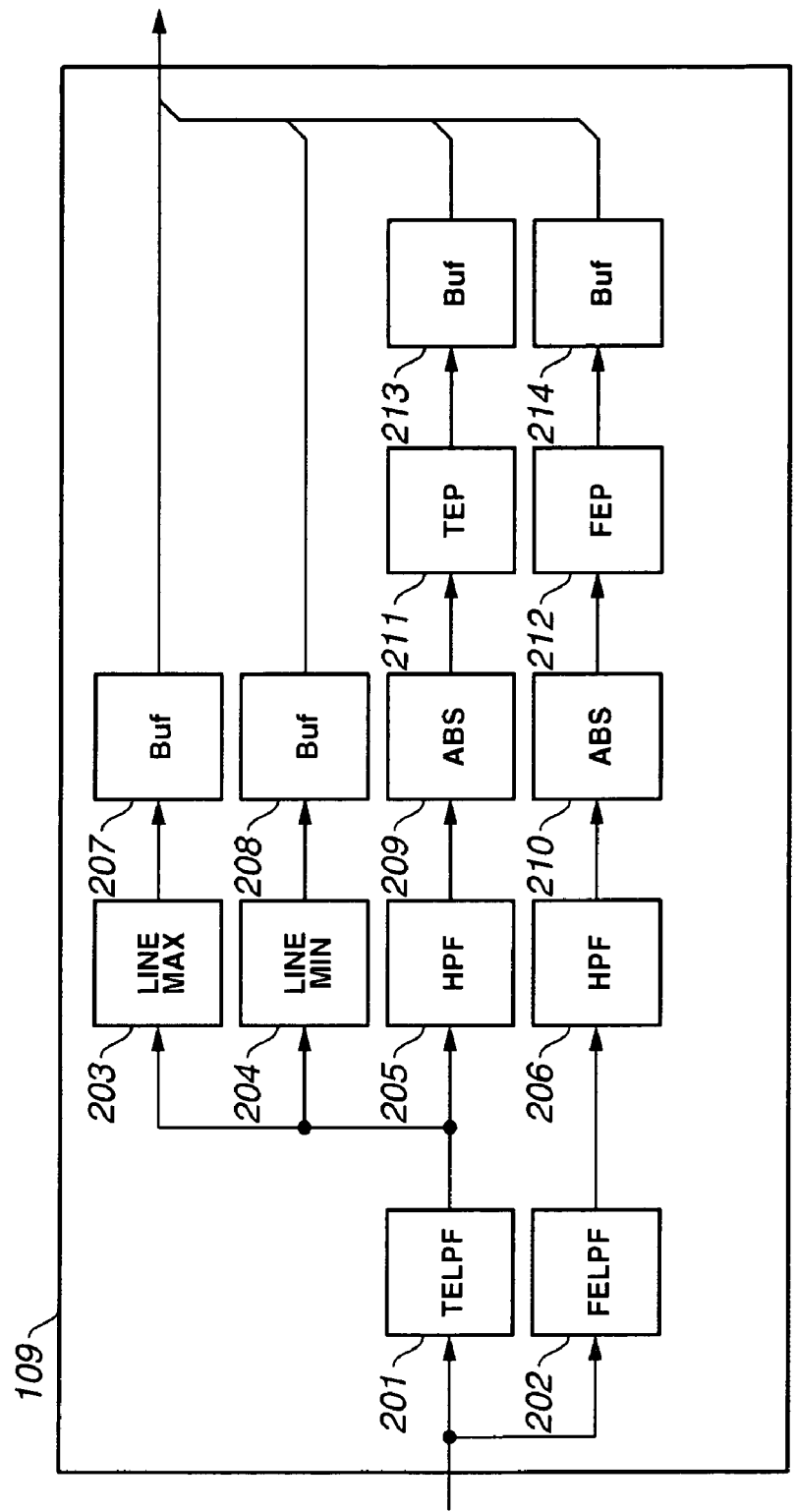
FIG. 2 is a block diagram of a configuration of a first AF evaluation value generating circuit of the imaging apparatus according to the first exemplary embodiment of the present invention.

The first AF evaluation value generating circuit 109 in the first exemplary embodiment will now be described in detail below with reference to FIG. 2.

The first AF evaluation value generating circuit 109 includes a low-pass filter 201 having a high cut-off frequency and a low-pass filter 202 having a low cut-off frequency. The first AF evaluation value generating circuit 109 further includes a maximum luminance level detection circuit 203 for detecting the maximum luminance level in one line of the video signal, and a minimum luminance level detection circuit 204 for detecting the minimum luminance level in one line. The first AF evaluation value generating circuit 109 further includes high-pass filters 205 and 206, and absolute value circuits 209 and 210. The first AF evaluation value generating circuit 109 further includes a maximum high-frequency component value detection circuit 211 for detecting the maximum high-frequency component value in one line of the video signal, and a maximum low-frequency component value detection circuit 212 for detecting the maximum low-frequency component value in one line. Buffer circuits 207, 208, 213, and 214 are configured to hold each AF evaluation value.

The video signal, which has been reduced to have only a luminance signal by the luminance signal extraction circuit 108 in FIG. 1, is supplied to the first AF evaluation value generating circuit 109 in the order of scanning lines to be supplied to the low-pass filters 201 and 202. In the low-pass filters 201 and 202, low-frequency components are extracted according to their respective predetermined filter characteristics. The output of the low-pass filter 201 having a high cut-off frequency is supplied to the maximum luminance level detection circuit 203, the minimum luminance level detection circuit 204, and the high-pass filter 205. The output of the low-pass filter 202 having a low cut-off frequency is supplied to the high-pass filter 206.

The maximum luminance level detection circuit 203 is initialized at a starting point of each scanning line. The maximum luminance level detection circuit 203 detects the maximum luminance level in each scanning line, and writes the detected maximum luminance level into the buffer circuit 207. Further, the minimum luminance level detection circuit 204 is initialized at a starting point of each scanning line. The minimum luminance level detection circuit 204 detects the minimum luminance level in each scanning line, and writes the detected minimum luminance level into the buffer circuit 208.

The high-pass filter 205 extracts a predetermined high-frequency component according to a predetermined filter characteristic from the luminance signal having passed through the low-pass filter 201, and supplies the extracted high-frequency component to the absolute value circuit 209. The absolute value circuit 209 converts the high-frequency component into an absolute value to obtain a positive high-frequency evaluation value. The obtained positive high-frequency evaluation value is supplied to the maximum high-frequency component value detection circuit 211. The maximum high-frequency component value detection circuit 211 is initialized at a starting point of each scanning line. The maximum high-frequency component value detection circuit 211 detects a maximum high-frequency component value in each scanning line, and writes the detected maximum high-frequency component value into the buffer circuit 213.

The high-pass filter 206 extracts a predetermined low-frequency component according to a predetermined filter characteristic from the luminance signal having passed through the low-pass filter 202, and supplies the extracted low-frequency component to the absolute value circuit 210. The absolute value circuit 210 converts the low-frequency component into an absolute value to obtain a positive low-frequency evaluation value. The obtained positive low-frequency evaluation value is supplied to the maximum low-frequency component value detection circuit 212. The maximum low-frequency component value detection circuit 212 is initialized at a starting point of each scanning line. The maximum low-frequency component value detection circuit 212 detects a maximum low-frequency component value in each scanning line, and writes the detected maximum low-frequency component value to the buffer circuit 214.

Each AF evaluation value (first evaluation value) generated by the first AF evaluation value generating circuit 109 is written in order into the corresponding fields in the storage circuit 110 with the corresponding scanning line address by the AF control circuit 112. Further, the AF evaluation value generated by the first AF evaluation value generating circuit 109 is supplied to the second AF evaluation value generating circuit 111.

Figure 3:
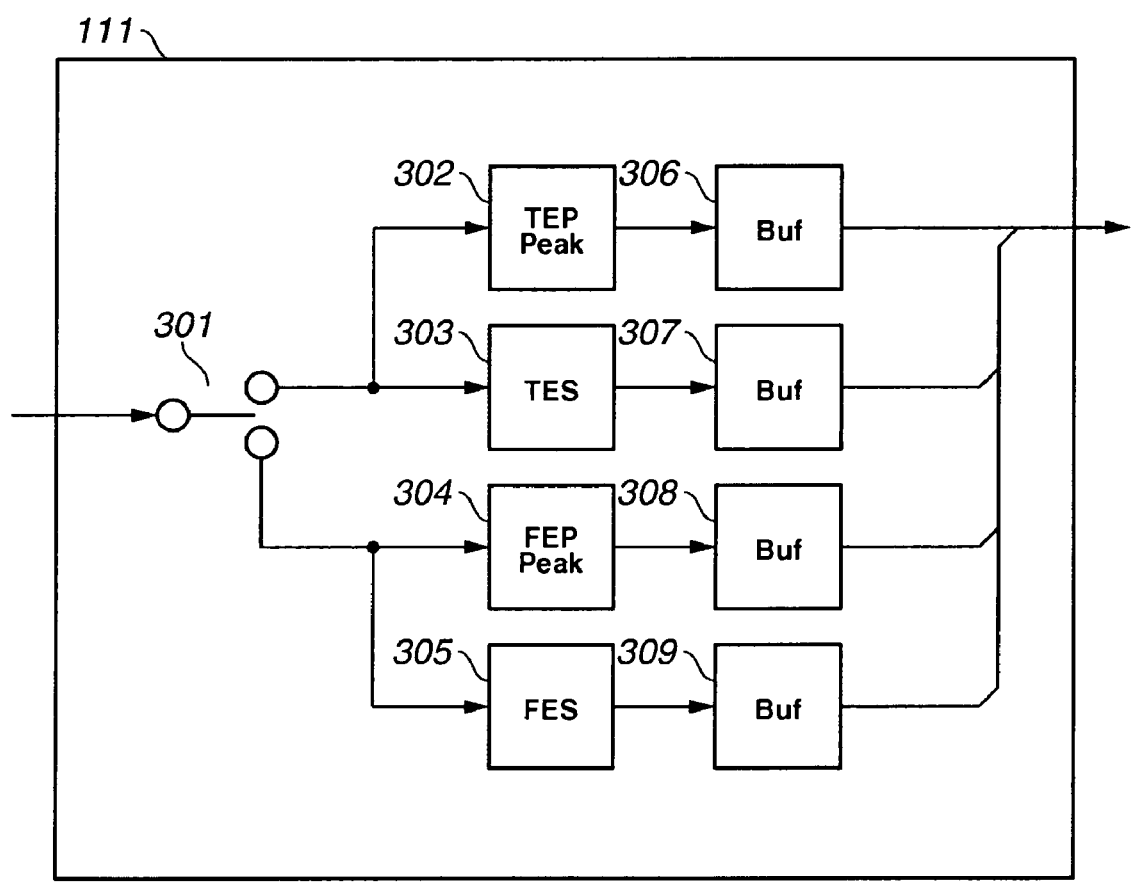
FIG. 3 is a block diagram of a configuration of a second AF evaluation value generating circuit of the imaging apparatus according to the first exemplary embodiment of the present invention.

The second AF evaluation value generating circuit 111 in the first exemplary embodiment will be described next in detail with reference to FIG. 3.

The second AF evaluation value generating circuit 111 includes an evaluation value switching circuit 301. The evaluation value switching circuit 301 is configured to switch each AF evaluation value from the first AF evaluation value generating circuit 109 when inputting these values to each processing circuit. The second AF evaluation value generating circuit 111 further includes a maximum high-frequency component value detection circuit 302 for detecting a maximum high-frequency component value in an AF detecting frame, and a high-frequency component integration circuit 303 for integrating high-frequency components in the AF detecting frame. The second AF evaluation value generating circuit 111 further includes a maximum low-frequency component value detection circuit 304 for detecting a maximum low-frequency component value in the AF detecting frame, a low-frequency component integration circuit 305 for integrating low-frequency components in the AF detecting frame.

Buffer circuits 306, 307, 308 and 309 are configured to hold the maximum high-frequency component value, the high-frequency component integration value, the maximum low-frequency component value, and the low-frequency component integration value of each AF evaluation value, respectively.

Each AF evaluation value generated by the first AF evaluation value generating circuit 109 is supplied to the second AF evaluation value generating circuit 111 to be input to the evaluation value switching circuit 301. The AF evaluation value held by the buffer circuit 213 is output to the maximum high-frequency component value detection circuit 302 and the high-frequency component integration circuit 303. Further, the AF evaluation value held by the buffer circuit 214 is output to the maximum low-frequency component value detection circuit 304 and the low-frequency component integration circuit 305.

The maximum high-frequency component value detection circuit 302 is initialized at a starting point of a head scanning line in the AF detecting frame. The maximum high-frequency component value detection circuit 302 detects a maximum high-frequency component in scanning lines within the AF detecting frame, and writes the detected maximum high-frequency component into the buffer circuit 306. The high-frequency component integration circuit 303 is initialized at a starting point of a head scanning line in the AF detecting frame. The high-frequency component integration circuit 303 integrates high-frequency components in scanning lines within the AF detecting frame, and writes the integrated value into the buffer circuit 307.

Further, the maximum low-frequency component value detection circuit 304 is initialized at a starting point of a head scanning line in the AF detecting frame. The maximum low-frequency component value detection circuit 304 detects a maximum low-frequency component in scanning lines within the AF detecting frame, and writes the detected maximum low-frequency component into the buffer circuit 308. The low-frequency component integration circuit 305 is initialized at a starting point of a head scanning line in the AF detecting frame. The low-frequency component integration circuit 305 integrates low-frequency components in scanning lines within the AF detecting frame, and writes the integrated value into the buffer circuit 309.

Figure 4A:
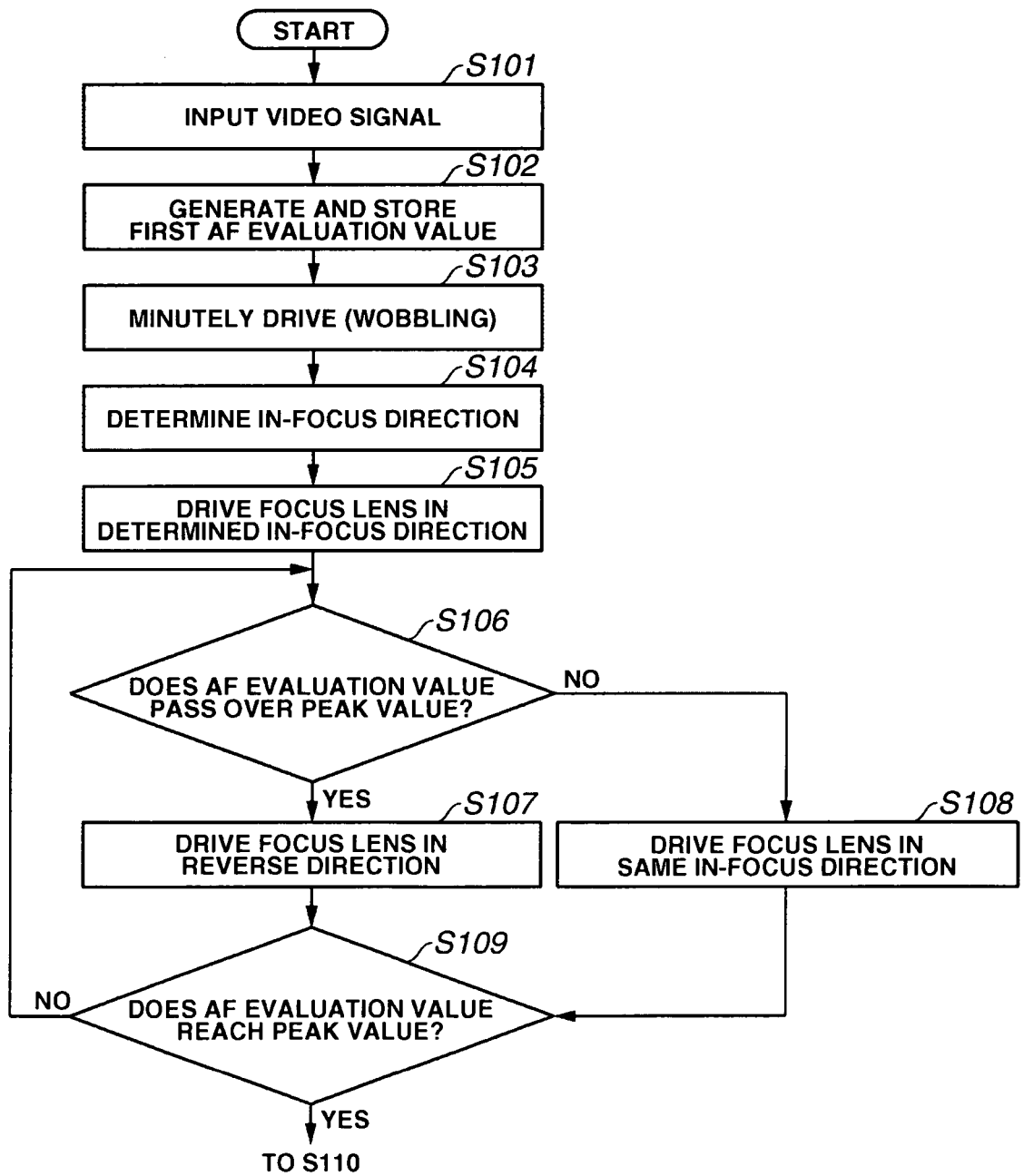
FIG. 4A is a flowchart illustrating an AF control operation of the imaging apparatus according the first exemplary embodiment.

An AF control operation will be now described in detail in a case where text information or character information is superimposed on the inputted video signal. FIGS. 4A and 4B are a flowchart illustrating the AF control operation in the imaging apparatus according to the first exemplary embodiment.

First, a video signal generated in the camera body 116 is supplied to the lens apparatus 101 (step S101), and an AF evaluation value is generated by the first AF evaluation value generating circuit 109 (step S102). The AF control circuit 112 outputs a signal for determining an in-focus direction to an in-focus direction determining circuit, and the in-focus determining circuit determines a driving direction as to whether an in-focus point is located on the far distance side or the close distance side with respect to the current position of the focus lens 106. The driving direction is determined based on a variation of the first evaluation value (step S104) when the motor 115 is driven to minutely drive (wobble) the focus lens 106 (step S103).

Further, the focus lens 106 is driven in the determined in-focus direction such that the first AF evaluation value output from the first AF evaluation value generating circuit 109 reaches a peak value (step S105). Then, it is determined whether the first AF evaluation value passes over the peak value (step S106). If it is determined that the first AF evaluation value has not yet passed over the peak value, the focus lens 106 is further driven in the determined in-focus direction to cause the first AF evaluation value to approach the peak value (step S108). If in step S106 it is determined that the first AF evaluation value passes over the peak value, the focus lens 106 is driven in a reverse direction with respect to the determined in-focus direction (step S107). Thus, the focus lens 106 is driven in units of a minute amount such that the first AF evaluation value becomes maximum (step S109).

In order to determine a variation of an object after attainment of an in-focus condition, the AF control circuit 112 reads AF evaluation values generated by the first AF evaluation value generating circuit 109 based on sequentially-input video signals, and compares the AF evaluation value obtained after attainment of an in-focus condition with the AF evaluation value obtained at the time of attainment of an in-focus condition (an AF operation restart determination process, step S110).

In comparison between the AF evaluation values, if it is determined that there is a variation of the AF evaluation value that is equal to or greater than a predetermined value (yes in step S111), it is determined that there is a variation (movement) of an object. Then, an in-focus direction determining operation is carried out, thus, restarting an AF operation. On the other hand, if the variation of the AF evaluation value is less than the predetermined value in step S111, the process returns to step S110 and waits until the movement of the object is detected.

When the movement of the object is detected in step S111, the process proceeds to step S112. In step S112, the in-focus direction determining circuit determines a driving direction as to whether an in-focus point is located on the far distance side or the close distance side with respect to the current position of the focus lens 106. The driving direction is determined based on the variation of the AF evaluation value when the motor 115 is driven to minutely drive the focus lens 106. In addition, in the first AF operation restart processing, since an AF evaluation value obtained at the time of the last attainment of an in-focus condition is not stored, it is always considered that there is a movement of the object in step S111. Accordingly, the process proceeds to step S112.

In step S112, the focus lens 106 is minutely driven toward the far distance side, and each first AF evaluation value output from the first AF evaluation value generating circuit 109 is written into the storage circuit 110. Further, the focus lens 106 is minutely driven toward the close distance side, and each first AF evaluation value output from the first AF evaluation value generating circuit 109 is written into the storage circuit 110.

Then, the AF control circuit 112 reads an AF evaluation value obtained at the time of attainment of an in-focus condition, an AF evaluation value obtained when the focus lens 106 is minutely driven toward the far distance side, and an AF evaluation value obtained when the focus lens 106 is minutely driven toward the close distance side, for every one scanning line (one line) of an input video signal (step S113).

In step S114, it is determined whether there is a difference (variation) between the maximum values of high-frequency components of each first AF evaluation value being equal to or greater than a predetermined value. If there is a difference being equal to or greater than the predetermined value, it is determined that superimposed information is not included in a video signal on the present read scanning line. In addition, in determining superimposed information, when the maximum luminance level and the minimum luminance level of the read AF evaluation value have a variation being equal to or greater than a predetermined value depending on the position of the focus lens 106, it can also be determined that superimposed information is not included in a video signal on the present scanning line.

If in step S114 it is determined that superimposed information is not included in a video signal on the present scanning line, the AF control circuit 112 enables the evaluation value switching circuit 301 and causes the AF evaluation value (first AF evaluation value) corresponding to the present scanning line to be supplied to the second AF evaluation value generating circuit 111 (step S115). That is, the AF control circuit 112 supplies a high-frequency component of the first AF evaluation value to the maximum high-frequency component value detection circuit 302 and the high-frequency component integration circuit 303. The AF control circuit 112 also supplies a low-frequency component of the first AF evaluation value to the maximum low-frequency component value detection circuit 304 and the low-frequency component integration circuit 305.

On the other hand, if the maximum value of a high-frequency component of the read AF evaluation value has a variation less than the predetermined value (no in step S114), it is determined that superimposed information is included in a video signal on the present scanning line. Accordingly, the AF control circuit 112 disables the evaluation value switching circuit 301 and prevents the first AF evaluation value from being supplied to the second AF evaluation value generating circuit 111. That is, the AF control circuit 112 does not generate an AF evaluation value (second AF evaluation value) corresponding to the present scanning line. In addition, when the maximum luminance level and the minimum luminance level of the read AF evaluation value have not a variation being equal to or greater than the predetermined value depending on the position of the focus lens 106, it can also be determined that superimposed information is included in a video signal on the present scanning line. Then, the evaluation value switching circuit 301 is disabled.

In the first exemplary embodiment as described above, a possibility that superimposed information becomes a high-frequency component of an AF evaluation value is utilized to determine whether superimposed information is included in a video signal according to an existence or nonexistence of a variation of the maximum value of a high-frequency component in each scanning line. That is, if a variation of an AF evaluation value is small even when there is a variation of an object, it is determined that superimposed information is included in a video signal.

Then, when the above-described AF control operation is performed for all of the scanning lines within the AF detection frame (step S116), AF evaluation values obtained from only scanning lines in which superimposed information is not included within the AF detection frame are generated by the second AF evaluation value generating circuit 111. After the AF evaluation value for one field is generated, the AF control circuit 112 reads the AF evaluation value to determine an in-focus direction (step S117).

Thus, the AF control circuit 112 drives the focus lens 106 based on the result of determining an in-focus direction, such that the second AF evaluation value output from the second AF evaluation value generating circuit 111 reaches a peak value. When the second AF evaluation value passes over the peak value, the driving direction of the focus lens 106 is reversed. Accordingly, the focus lens 106 is driven such that the second AF evaluation value becomes maximum.

In the first exemplary embodiment, the focusing operation is carried out while controlling inputting of an AF evaluation value to the second AF evaluation value generating circuit 111 for every scanning line of a video signal, in accordance with the first AF evaluation value stored in the storage circuit 110 for every scanning line of a video signal. Even when text or character information is superimposed on a video signal input to the lens apparatus 101, any supplementary information to the superimposed information, any specific process, and any data holding are not necessary. Accordingly, stable and suitable AF control can be carried out.

Second Exemplary Embodiment

Figure 5:
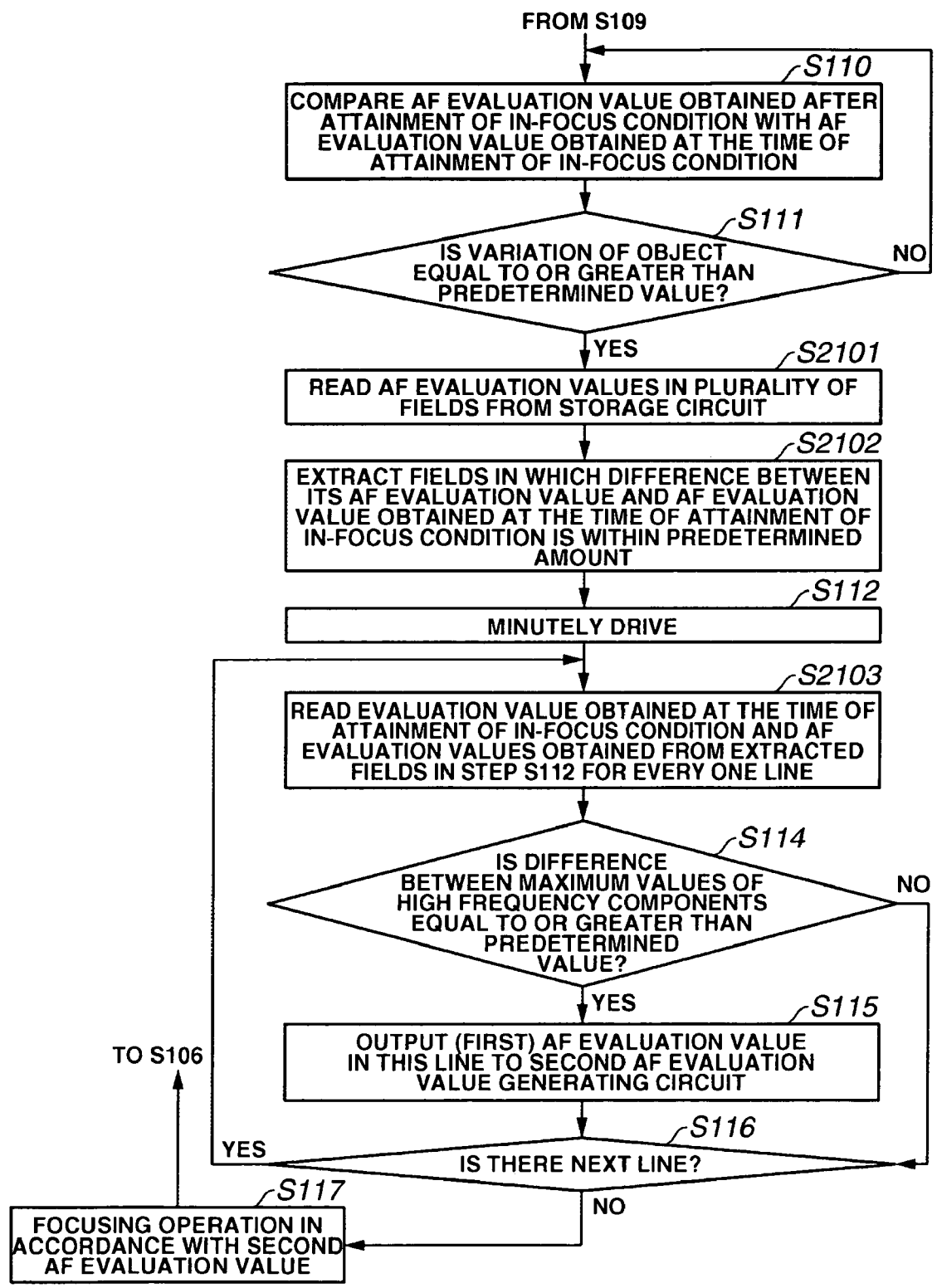
FIG. 5 is a flowchart illustrating an AF control operation of an imaging apparatus according a second exemplary embodiment.
Figure 6:
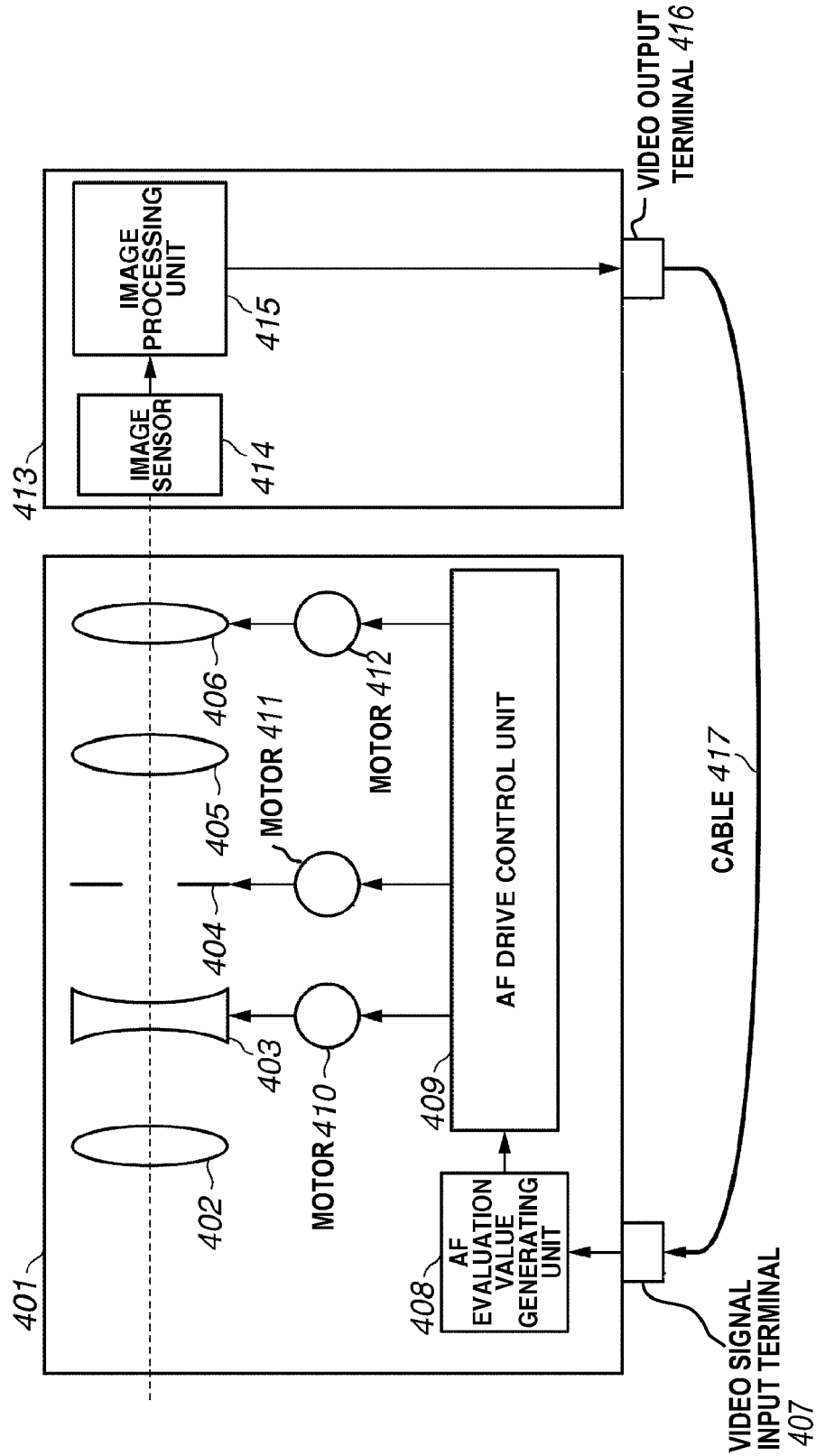
FIG. 6 is a block diagram of configurations of a camera body and a lens apparatus according to a conventional example.

FIG. 5 is a flowchart illustrating an AF control operation of an imaging apparatus according to a second exemplary embodiment. In the second exemplary embodiment, an AF control operation is discussed in a case where an input video signal has text or character information superimposed thereon at intervals of a predetermined number of fields or frames. In addition, the configuration of the imaging apparatus illustrated in FIG. 1 and the AF control processing according to the flow chart illustrated in FIG. 4A in the first exemplary embodiment are similar to those of the second exemplary embodiment, and, therefore, the description thereof is not repeated herein.

In FIG. 5, in order to determine a variation of an object after attainment of an in-focus condition, the AF control circuit 112 reads an AF evaluation value (first AF evaluation value) generated by the first AF evaluation value generating circuit 109 in cycles of vertical synchronizing signals, and compare the present AF evaluation value with an AF evaluation value obtained at the time of attainment of an in-focus condition (step S110). In comparison between the AF evaluation values, if it is determined that there is a variation of the AF evaluation value that is equal to or greater than a predetermined value (yes in step S111), there is a possibility that superimposed information may exist in a video signal. Therefore, the AF control circuit 112 further reads AF evaluation values in a plurality of fields from the storage circuit 110 (step S2101).

Then, the AF control circuit 112 enables, in the read AF evaluation values, only AF evaluation values in fields in which a difference between the present AF evaluation value and an AF evaluation value obtained at the time of attainment of an in-focus condition is within a predetermined amount (step S2102). That is, if the difference is within the predetermined amount, the associated field is considered to be a field which has no superimposed information. Accordingly, only the fields considered to be a field which has no superimposed information are extracted. Then, the process proceeds to in-focus direction determining processing (step S112).

In step S112, the in-focus direction determining circuit determines a driving direction as to whether an in-focus point is located on the far distance side or the close distance side with respect to the current position of the focus lens 106. The driving direction is determined based on the variation of the first AF evaluation value in each position of the focus lens 106 when the motor 115 is driven to minutely drive the focus lens 106.

First, the focus lens 106 is minutely driven toward the far distance side, and each AF evaluation value output from the first AF evaluation value generating circuit 109 is written into the storage circuit 110 in each field which has no superimposed information. Then, the focus lens 106 is minutely driven toward the close distance side, and each AF evaluation value output from the first AF evaluation value generating circuit 109 is written into the storage circuit 110 in each field which has no superimposed information (step S2103).

Then, the AF control circuit 112 reads an AF evaluation value obtained at the time of attainment of an in-focus condition, an AF evaluation value obtained when the focus lens 106 is minutely driven toward the far distance side, and an AF evaluation value obtained when the focus lens 106 is minutely driven toward the close distance side, for every one scanning line of an input video signal.

If the difference between the maximum values of high-frequency components of each AF evaluation value is equal to or greater than a predetermined value, or if the differences of the read maximum luminance level and minimum luminance level are equal to or greater than a predetermined value (step S114), it is determined that superimposed information is not included in a video signal on the present scanning line. When it is determined that superimposed information is not included in a video signal on the present scanning line, the AF control circuit 112 enables the evaluation value switching circuit 301. At this time, the AF control circuit 112 supplies a high-frequency component of the AF evaluation value to the maximum high-frequency component value detection circuit 302 and the high-frequency component integration circuit 303 of the second AF evaluation value generating circuit 111. The AF control circuit 112 also supplies a low-frequency component of the AF evaluation value to the maximum low-frequency component value detection circuit 304 and the low-frequency component integration circuit 305 (step S115).

If in step S114 the difference between the read maximum values of high-frequency components of each AF evaluation value is less than the predetermined value, or if the differences of the read luminance maximum level and minimum luminance level are less than the predetermined value, it is determined that superimposed information is included in a video signal on the present scanning line. At this time, the AF control circuit 112 disables the evaluation value switching circuit 301, and prevents the second AF evaluation value generating circuit 111 from generating the second AF evaluation value.

Then, when the above-described steps are performed for all of the scanning lines within the AF detection frame (step S116), second AF evaluation values obtained from only scanning lines in which superimposed information is not included within the AF detection frame are generated by the second AF evaluation value generating circuit 111. After the second AF evaluation value for one field is generated, the AF control circuit 112 carries out a focusing operation based on the second AF evaluation value (step S117).

In the focusing operation, the AF control circuit 112 drives the focus lens 106 such that the second AF evaluation value output from the second AF evaluation value generating circuit 111 reaches a peak value. When the second AF evaluation value pass over the peak value, the driving direction of the focus lens 106 is reversed. Accordingly, the focus lens 106 is driven such that the second AF evaluation value becomes maximum.

In the second exemplary embodiment, the focusing operation is carried out while controlling inputting of an AF evaluation value to the second AF evaluation value generating circuit 111 for every scanning line of a video signal, in accordance with the first AF evaluation values stored for a plurality of fields for every scanning line of a video signal. Accordingly, even when superimposed information is included in a video signal in a blinking manner at intervals of a predetermined number of fields or frames of a video signal, a suitable AF operation can be carried out.

That is, even when superimposed information blinks at intervals of a predetermined number of fields or frames of a video signal, a suitable AF operation can be provided without erroneously recognizing the blinking of superimposed information as the variation of an object, and without the need of supplementary information or the like.

In the above-described embodiments, the contrast-type hill-climbing AF control operation has been discussed. However, the present invention can be applied to a full scan AF control system.

In the full scan AF control system, a first in-focus position is obtained based on the first AF evaluation value, and a second in-focus position is obtained based on the second evaluation value generated in the superimposed-information detection processing of FIG. 4B (from step S111 to step S117) Further, a focusing operation is carried out by driving the focus lens 106 so as to correct an in-focus point from the first in-focus position to the second in-focus position.

In the first and second exemplary embodiments, the first AF evaluation value generating circuit 109 and the second AF evaluation value generating circuit 111 are mounted in the lens unit 101. However, the present invention is not limited to this configuration. The first AF evaluation value generating circuit 109 and the second AF evaluation value generating circuit 111 can be mounted in the camera body 116.

In the first and second exemplary embodiments, an imaging apparatus for broadcasting has been discussed. However, the present invention is not limited to a broadcasting apparatus. The present invention can also be applied to a consumer video camera.

According to the present invention, even when text information, character information or the like is superimposed on a video signal, a suitable AF control operation can be performed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-131330 filed Apr. 28, 2005, which is hereby incorporated by reference herein in its entirety.

What is claimed is:

1. A lens apparatus mountable on a camera apparatus, comprising:

an imaging optical system including a focus lens unit;

a first generating unit configured to generate a first sharpness evaluation value from a video signal output from the camera apparatus corresponding to an output signal from an imaging unit configured to photoelectrically convert an object image formed by the imaging optical system, the video signal including scanning lines that carry superimposed information which reduces an amount of variation of the first sharpness evaluation value for those scanning lines, the video signal also including scanning lines that do not carry such superimposed information;

a second generating unit configured to generate a second sharpness evaluation value using the first sharpness evaluation value; and a control unit configured to control a focus adjusting operation of the imaging optical system based on the first sharpness evaluation value or the second sharpness evaluation value, wherein the lens apparatus is configured to determine whether the amount of variation of the first sharpness evaluation value when the focus lens unit is moved for each scanning line is equal to or greater than a predetermined amount, and to generate the second sharpness evaluation value, not using the first sharpness evaluation value of a scanning line when the amount of variation is less than the predetermined amount, but using the first sharpness evaluation value of a scanning line when the amount of variation is equal to or greater than the predetermined amount, and to drive the focus lens unit to the in-focus position, using the second sharpness evaluation value.

2. The lens apparatus according to claim 1, wherein the control unit is configured to detect the superimposed information according to a difference between the first sharpness evaluation value obtained at the time of attainment of an in-focus condition of the imaging optical system and the first sharpness evaluation value obtained after attainment of the in-focus condition.

3. The lens apparatus according to claim 1, wherein the first generating unit is configured to generate the first sharpness evaluation value for a plurality of fields of the video signal.

4. An imaging apparatus comprising:

a lens apparatus according to claim 1; and a camera apparatus mounted on the lens apparatus.

5. An imaging apparatus comprising:

an imaging optical system including a focus lens unit;

a video signal generating unit configured to generate a video signal corresponding to an output signal from an imaging unit configured to photoelectrically convert an object image formed by the imaging optical system;

a first generating unit configured to generate a first sharpness evaluation value from the video signal, the video signal including scanning lines that carry superimposed information which reduces an amount of variation of the first sharpness evaluation value for those scanning lines, the video signal also including scanning lines that do not carry such superimposed information;

a second generating unit configured to generate a second sharpness evaluation value using the first sharpness evaluation value; and a control unit configured to control a focus adjusting operation of the imaging optical system based on the first sharpness evaluation value or the second sharpness evaluation value, wherein the lens apparatus is configured to determine whether the amount of variation of the first sharpness evaluation value when the focus lens unit is moved for each scanning line is equal to or greater than a predetermined amount, and to generate the second sharpness evaluation value, not using the first sharpness evaluation value of a scanning line when the amount of variation is less than the predetermined amount, but using the first sharpness evaluation value of a scanning line when the amount of variation is equal to or greater than the predetermined amount, and to drive the focus lens unit to the in-focus position, using the second sharpness evaluation value.

6. The imaging apparatus according to claim 5, wherein the control unit is configured to detect the superimposed information according to a difference between the first sharpness evaluation value obtained at the time of attainment of an in-focus condition of the imaging optical system and the first sharpness evaluation value obtained after attainment of the in-focus condition.

7. The imaging apparatus according to claim 5, wherein the first generating unit is configured to generate the first sharpness evaluation value for a plurality of fields of the video signal.

8. An automatic focusing control method for a lens apparatus mountable on a camera apparatus, the lens apparatus including an imaging optical system having a focus lens unit, the automatic focusing control method comprising the steps of:

receiving a video signal from the camera apparatus corresponding to an output signal from an imaging unit configured to photoelectrically convert an object image formed by an imaging optical system;

generating a first sharpness evaluation value based on the video signal;

detecting superimposed information included in the video signal, which is superimposed on the output signal, by determining whether an amount of variation of the first sharpness evaluation value when the focus lens unit is moved for each scanning line is less than a predetermined amount;

generating a second sharpness evaluation value, not using the first sharpness evaluation value of a scanning line when the amount of variation is less than the predetermined amount, but using the first sharpness evaluation value of a scanning line when the amount of variation is equal to or greater than the predetermined amount; and performing a focus adjusting operation of the imaging optical system based on the second sharpness evaluation value.

9. The lens apparatus according to claim 1, wherein the amount of variation is either an amount of variation amount between the maximum values of high-frequency components of the first sharpness evaluation value or an amount of variation between the maximum luminance level and the minimum luminance level of the first sharpness evaluation value.

* * * * *